US008559050B2

(12) United States Patent
Conlon et al.

(10) Patent No.: US 8,559,050 B2
(45) Date of Patent: Oct. 15, 2013

(54) CONTROLLING PLACEMENT AND MINIMIZING DISTORTION OF IMAGES IN AN IMAGING DEVICE

(75) Inventors: Paul Roberts Conlon, South Bristol, NY (US); Zhigang Fan, Webster, NY (US); Gerald A. Wedekind, Rancho Palos Verdes, CA (US); Stuart Alan Schweid, Pittsford, NY (US); Abu Saeed Islam, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1010 days.

(21) Appl. No.: 12/614,673

(22) Filed: Nov. 9, 2009

(65) Prior Publication Data
US 2011/0109918 A1 May 12, 2011

(51) Int. Cl.
*G06K 15/02* (2006.01)
(52) U.S. Cl.
USPC ............ 358/1.2; 358/474; 358/501; 358/518; 382/197; 382/188; 434/322; 434/353; 434/362
(58) Field of Classification Search
USPC ......................................................... 358/1.2
See application file for complete search history.

(56) References Cited

U.S. PATENT DOCUMENTS

2009/0324026 A1* 12/2009 Kletter .......................... 382/124

OTHER PUBLICATIONS

U.S. Appl. No. 12/194,959, filed Aug. 20, 2008, Conlon.
U.S. Appl. No. 12/338,260, filed Dec. 18, 2008, Conlon.
U.S. Appl. No. 12/338,300, filed Dec. 18, 2008, Conlon.
U.S. Appl. No. 12/338,318, filed Dec. 18, 2008, Conlon.
U.S. Appl. No. 12/339,148, filed Dec. 19, 2008, Fan et al.

* cited by examiner

*Primary Examiner* — Twyler Haskins
*Assistant Examiner* — Brendan McCommas
(74) *Attorney, Agent, or Firm* — Philip E. Blair; Fleit Gibbons Gutman Bongini & Bianco P.L.

(57) ABSTRACT

What is disclosed is a novel system and method to control an imaging device. A first collection of a plurality of two-dimensional image points in a first vector space for a source image and a second collection of a plurality of two-dimensional image points in a second vector space for a target image are received. The first collection of two-dimensional image points and the second collection of two-dimensional image points are converted into a homogenous form to apply affine matrix transformations. A matrix transformation is solved to map the first collection of the plurality of two-dimensional image points to the second collection of the plurality of two-dimensional image points. The matrix transformation is used to adjust distortion of the target image in an imaging device.

20 Claims, 16 Drawing Sheets

FIG. 12

| | APPLICATION | DESCRIPTION | FORWARD MAPPING | INVERSE MAPPING |
|---|---|---|---|---|
| 1. | MAPPING A SET OF COORDINATE POINTS $P_0$ IN VECTOR SPACE S IS MAPPED TO A NEW SET OF COORDINATE POINTS $P_1$ IN VECTOR SPACE T VIA A MAPPING OR TRANSFORMATION K | MAPPING BETWEEN DOMAIN (SPACE 0) TO A CO-DOMAIN (SPACE 1) (GENERAL CASE) | $K_{01}: [P_0]_S \to [P_1]_T$<br>$K_{10}: [P_1]_S \to [P_0]_T$ | $K_{01}^{-1}: [P_1]_S \to [P_0]_T$<br>$K_{10}^{-1}: [P_0]_S \to [P_1]_T$ |
| 2. | REFERENCE-ACTUAL MAPPING (GENERAL) | MAPPING BETWEEN REFERENCE (R) AND ACTUAL (A) SPACES. ALIGNING TO A REFERENCE REMOVES (MINIMIZES) DISTORTIONS AND ALIGNMENT ISSUES | $K_{AR}: [P_1]_A \to [P_0]_R$<br>$K_{RA}: [P_0]_R \to [P_1]_A$ | $K_{AR}^{-1}: [P_0]_R \to [P_1]_A$<br>$K_{RA}^{-1}: [P_1]_A \to [P_0]_R$ |
| 3. | ALIGN TO REFERENCE (DETAILED) | MODELS DISTORTION AND MISALIGNMENT AS A TRANSFORMATION BETWEEN A REFERENCE INPUT IMAGE AND ACTUAL OUTPUT IMAGE. AN INVERSE OF THE DISTORTION TRANSFORMATION MAPS AN ACTUAL IMAGE BACK TO REFERENCE SPACE, AND IS THEREFORE "CORRECTED". FOR CORRECTED SEE-THROUGH ALIGNMENT, A REFERENCE IMAGE IS PRINTED ON EACH SIDE TO OBTAIN TWO ACTUAL IMAGES, $A_0$ ON SIDE 1 AND $A_1$ ON SIDE 2. | $K_{RA0}: [P_0]_R \to [P_1]_{A0}$<br>$K_{A0R}: [P_1]_{A0} \to [P_0]_R$<br><br>$K_{RA1}: [P_0]_R \to [P_2]_{A1}$<br>$K_{A1R}: [P_2]_{A1} \to [P_0]_R$ | $K_{RA0}^{-1}: [P_1]_{A0} \to [P_0]_R$<br>$K_{A0R}^{-1}: [P_0]_R \to [P_1]_{A0}$<br><br>$K_{RA1}^{-1}: [P_2]_{A1} \to [P_0]_R$<br>$K_{A1R}^{-1}: [P_0]_R \to [P_2]_{A1}$ |
| 4. | ALIGN TO ACTUAL (GENERAL) | USEFUL FOR UNCORRECTED SEE-THROUGH ALIGNMENT, FORMS AND POSSIBLY HLC. ALIGN ONE ACTUAL TO ANOTHER, BUT NEITHER TO REFERENCE (UNCORRECTED-DISTORTION FROM REFERENCE NOT REMOVED). | $K_{A0A1}: [P_1]_{A0} \to [P_2]_{A1}$<br>$K_{A1A0}: [P_2]_{A1} \to [P_1]_{A0}$ | $K_{A0A1}^{-1}: [P_2]_{A1} \to [P_1]_{A0}$<br>$K_{A1A0}^{-1}: [P_1]_{A0} \to [P_2]_{A1}$ |
| 5. | ALIGN TO FORM | SPECIAL CASE ALIGN TO ACTUAL. IN THIS APPLICATION, THE FORM F IS PRINTED AND THEREFORE FIXED. THE CUSTOMER IMAGE TO BE PRINTED ONTO THE FORM IS MANIPULATED SO AS TO FIT OPTIMALLY ONTO THE IMPERFECT, DISTORTED FORM (e.g., IT HAS SKEW, SHIFT AND STRETCHING ERROR THAT WILL BE ADAPTED TO). | $K_{FA1}: [P_1]_F \to [P_2]_{A1}$<br>$K_{A1F}: [P_2]_{A1} \to [P_1]_F$ | $K_{AFA1}^{-1}: [P_2]_{A1} \to [P_1]_F$<br>$K_{A1F}^{-1}: [P_1]_F \to [P_2]_{A1}$ |

FIG. 13A

| 6. | ALIGN TO MARKING ENGINE OR LAYER | FOR HIGHLIGHT COLOR (HLC) AND SIMILAR APPLICATIONS TYPICALLY MULTIPLE ENGINES $E_n$ MARK MULTIPLE IMAGE LAYERS ONTO A SHEET. TRANSFORMATION ARE MODELED AS ABOVE AND CAN USE EITHER THE ALIGN TO REFERENCE OR ALIGN TO ACTUAL TRANSFORMATIONS (CORRECTED OR UNCORRECTED). HERE ONLY ALIGN TO ACTUAL IS SHOWN (e.g., ALIGN ALL LAYERS TO FIRST LAYER MARKED ON FIRST ENGINE IN A SEQUENCE OF ENGINES). AN ALIGN TO REFERENCE ALTERNATIVE WOULD FOLLOW AS ABOVE WHERE ALL ACTUALS FOR EACH ENGINE/LAYER ARE THUS BOTH ALIGNED ACROSS ENGINES AND CORRECTED TO REFERENCE.<br><br>AS BEFORE POINTS P ARE RELATIVE TO SPACES R OR A, BUT ARE NOW QUALIFIED RELATIVE TO WHICH MARKING ENGINE E IS USED. FOLLOWING CONVENTION, ANOTHER SET OF NESTING BRACKETS ARE USED. FOR EXAMPLE, THE POINTS $P_n$ ARE MARKED AS AN ACTUAL IMAGE $A_n$ ON ENGINE $E_n$ WOULD BE: $[[P_n]A_n]E_n$. | $K_{A0A1}$:<br>$[[P_0]A_0]E_0 \rightarrow [[P_1]A_1]E_1$<br><br>$K_{A1A0}$:<br>$[[P_1]A_1]E_1 \rightarrow [[P_0]A_0]E_0$ | $K_{A0A1}^{-1}$:<br>$[[P_1]A_1]E_1 \rightarrow [[P_0]A_0]E_0$<br><br>$K_{A1A0}^{-1}$:<br>$[[P_0]A_0]E_0 \rightarrow [[P_1]A_1]E_1$ |
|---|---|---|---|---|

FIG. 13B

UNCORRECTED DISPLACEMENT FROM REFERENCE $d_R[P]_1$ or $[P]A$

UNCORRECTED DISPLACEMENT FROM REFERENCE $d_R[P]_2$ or $[P]A$

CORRECTED ACTUAL-ACTUAL, BOTH ALIGNED
TO REFERENCE | {$P_R$} - ₂{$P_R$} |

UNCORRECTED ACTUAL-ACTUAL DISPLACEMENT
| [$P_{A0}$ - $P_A$] |

CONTROLLING PLACEMENT AND MINIMIZING DISTORTION OF IMAGES IN AN IMAGING DEVICE

TECHNICAL FIELD

The present invention is directed to systems and methods for controlling placement and minimizing distortion of images by scanners, copiers, and printers.

BACKGROUND

Generally, in a duplex printed sheet it is desirable and expected that images on each side of a page are aligned correctly on a page. A common test is to print a test pattern on each side of a sheet such that with perfect alignment the registration marks will be aligned when the sheet is viewed is a see-thru fashion (typically, holding the sheet to a light source so that a customer can visually test alignment). There are numerous reasons why registration may be poor, for example including but not limited to image distortions or placement on sheet due to situations such as paper shrinkage due to the fusing step, mechanical misalignment of the sheet in the paper path, or magnification errors caused by the xerographic process. Further, in situations where the sheet is fused twice and inverted for duplex, alignment and printable substrate shrinkage typically varies on a per sheet side basis. As such undesired registration errors are introduced by the inherent limitations and anomalies of the device. Registration of image-to-image, image-to-sheet, or sheet-to-device can be suboptimal for multiple reasons, including paper shrinkage and setup error caused by the operator or by device limitations. Poor show-through or see-through alignment and/or poor highlight color (HLC) registration results in reduced Customer satisfaction.

Systems for control of image placement provided by conventional measurements are typically limited. For example, in most conventional systems, only printer spatial errors at the corners of a sheet are determined. For most media, the measurement process is typically performed manually. Errors that occur during printing or scanning can be caused by, for example, Raster Output Scanner (ROS) scan line bow, ROS magnification, lateral errors, and skew errors, which cannot be determined from measurements taken using conventional techniques. Paper shrinkage caused by the fusing process can also result in errors that have well defined intra sheet signatures.

Existing registration methods typically use basic algebra/trigonometry and piece-wise mechanical and xerographic setup adjustments. For example, calculating rotation needed after a shift. Alignment in imaging contexts is also common. Further, other 2D least squares techniques ordinarily use a complicated polynomial form (e.g., $y=\beta_0+\beta_1 x+\beta_2 x^2+\beta_3 x^3$) or complex multivariate form (e.g., $y=\beta_0+\beta_1 u+\beta_2 v+\beta_3 u^2+\beta_4 uv+\beta_5 v^2$) which is incompatible or less well suited for commonly available image processing systems/tools. See: *Linear Algebra and its Applications*, by David C. Lay, Addison Wesley, 3$^{rd}$ Ed., (Jul. 18, 2002). ISBN-10: 0201709708, ISBN-13: 978-0201709704, the teachings of which are incorporated herein by reference in its entirety.

Accordingly, what is needed in this art are systems and methods for correcting image-to-image, image-to-sheet and sheet-to-device registration errors which overcome many of the above-identified problems with existing registration techniques.

BRIEF SUMMARY

What is disclosed is a novel system and method for correcting image-to-sheet and image-to-image registration errors which minimizes image distortion in image capture devices (such as scanners) and in image output devices (such as printers). The present system and method determines an amount of a spatial error for a scanner or a printer by using an ideal reference which, in one embodiment, is a reference two-dimensional array comprising a grid having a geometric shape which is stored as dots, for example, on film or in a computer readable file. Positional information associated with the reference two-dimensional array is compared with an actual two-dimensional array substantially similar in shape to the first grid to determine an amount of spatial error. As there are multiple registration measurements throughout the medium, individual spatial errors in the scanner or printer, and their unique error contributions can be determined. Once determined, images placed for example, on a platen of a scanning device, can be manipulated such that misregistration errors across differing devices can be compensated by sending along error mapping information with the image data.

The present method can be used to calibrate images with a grid of calibration points and measure the points after printing in either simplex or duplex mode. The present invention overcomes problems with existing registration and error correction techniques by leveraging computer graphics and linear algebra mathematics (affine form, homogeneous coordinates) for correcting image-to-image, image-sheet and sheet-to-device registration errors. Unlike prior art solutions, the mathematical corrections performed by the present invention are in CTM form and therefore readily consumable by e.g., Postscript, image processing, and computer graphics cards, and can be decomposed into discrete operations. Further, the present method uses a common computer graphics paradigm applied to print registration. This form makes it easy to integrate into a decomposer or graphics accelerator that supports matrix operations (e.g., PostScript). For printing, the correction transformation pre-distorts the image such that, when the sheet is printed, this distortion cancels the distortion introduced by the printing process. Alternatively, for scanning the image is corrected post-scanning but prior to subsequent processing.

Vectors spaces and mapping between vector spaces are used along with linear algebra for matrix algebra, inverse mappings, and pseudo-inverse. Matrix algebra is utilized herein to solve for an amount of a registration correction transformation using a pseudo-inverse. A displacement vector magnitude for each point is calculated and the collection of all displacements is used to characterize the error (e.g., Mean, SD, Max, Min). An optimized linear solution is derived. The present method also creates a transformation that simultaneously and efficiently addresses scaling, rotation, translation, and shear as part of the composite transformation matrix (CTM) produced. Overlapping point graphics are used to show see-through alignment for current/actual and corrected states. Use of vector flow graphs of displacement vectors is useful as a visual aid in understanding of registration errors and assessing degree of linearity of data or verifying "goodness of fit". Appropriately generated, these graphs are useful in terms of operations and demonstration of ability to correct for system errors. More information on "goodness of fit" and vector flow graphs is described in U.S. patent application Ser. No. 12/194,958, filed Aug. 20, 2008, entitled "Method To Improve Image on Paper Registration Measurements" by Kulkarni et al., and commonly assigned herewith to Xerox Corporation and the teachings of which is incorporated herein by reference in its entirety.

In one embodiment, a calibration image or reference image with a grid of points in known coordinates is first printed.

Actual points displaced by the printing process are measured. A mathematical mapping between reference and actual is made for each side of interest. The affine transformation produced is in computer graphics composite transformation matrix (CTM) form. Mappings may also be made either directly or indirectly between actual data for both see-through and highlight color (HLC) registration. Calibration and measured coordinates are converted into homogeneous coordinates or to homogeneous form. In one embodiment, a pseudo-inverse is applied to create a least squares inverse of calibration points. Matrix algebra is used to solve for the transformation and for mapping between calibration and actual spaces. The inverse mapping provides a correction transformation from actual to calibration that will be applied to the image prior to printing. Other similar mappings are used for image-to-image alignment.

In another embodiment, the present method corrects for see-through registration error in imaging devices. In the case when see-through (or show-through) points printed on each side of a duplex sheet are perfectly aligned there is zero displacement. A reference image with a grid of points that span the document is used. Registration error is the difference between actual measured points and the reference. Images may be see-through aligned but not aligned to reference. Conversely, each side may be aligned to reference, which indirectly gives good see-through alignment and a more accurate presentation. Image-on-image registration is considered for both see-through alignment and highlight color (HLC) image alignment to a single side.

Unlike the prior art, the present method provides mathematical corrections for image-to-image mapping. Corrections to better than 0.1 mm mean displacement error have been shown. The ability to realize this mathematical correction is only limited by the inherent variability within a particular imaging device. Further, the mathematical corrections performed hereby are readily consumable by e.g., Postscript, image processing, and graphics cards, and can be decomposed. Further, insights into variability may be gained that could lead to reductions in variability by examining the decomposed mathematical corrections taught in the present invention.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 12 illustrates spatial errors and corrections to a printed form used in image registrations;

FIG. 13 is a chart of various embodiments for forward mapping and inverse mapping of a collection of source points $P_0$ to a collection of target points $P_1$;

DETAILED DESCRIPTION

What is disclosed is a novel system and method for computing and controlling the precise placement and minimizing the distortion of images in image capture devices (such as scanners) and image output devices (such as printers). Various embodiments hereof control both the removal of distortion as well as the precise placement of images in image capture devices and imaging forming devices. The present method is intended to work for both simplex and duplex alignment and registration.

Mathematical Notations

Figure 1:
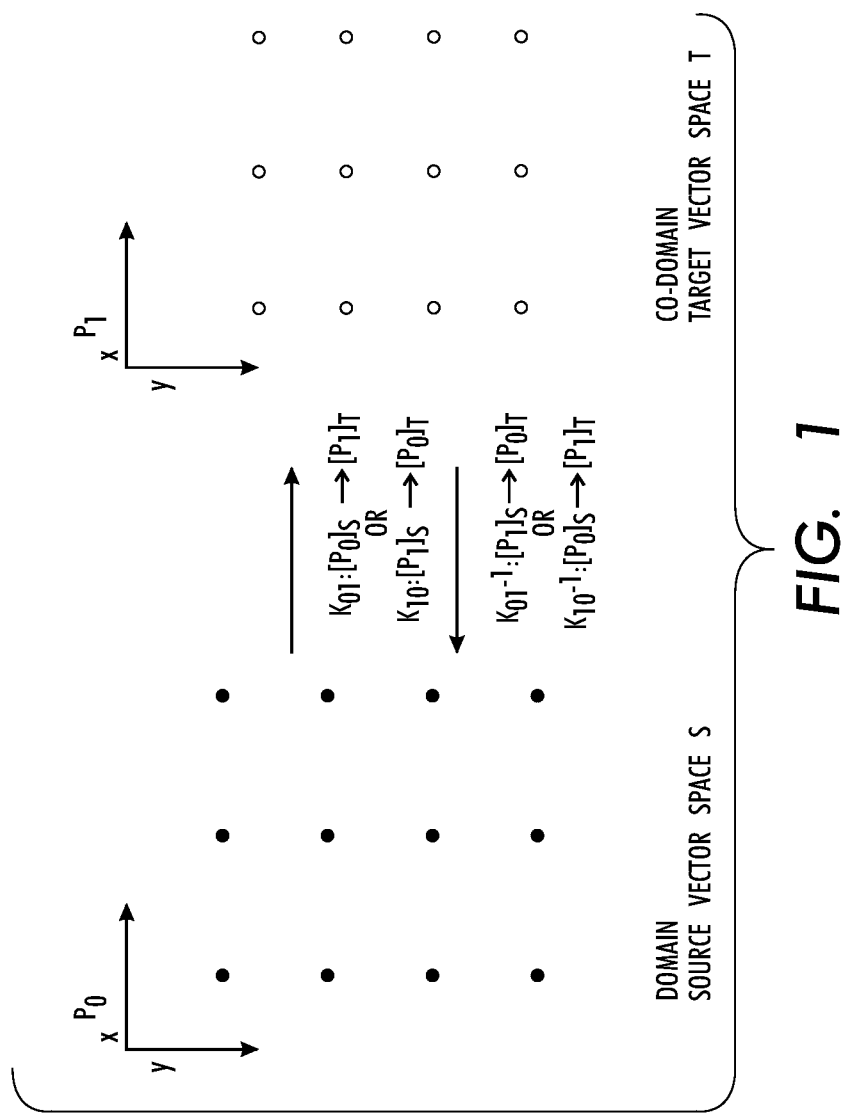
FIG. 1 illustrates a general mapping or transformation K of a collection of coordinate points $P_0$ to a collection of target points $P_1$.

A coordinate point p is defined by its {x,y} values in a 2D vector space V. For multiple points each individual point can be defined as $p_n = \{x_n, y_n\}$. A collection or set of points $P = \{p_0, p_1, p_2, \ldots, p_n\}$. Coordinate points are relative to a particular vector space. For set P relative to vector space V, this is denoted as $[P]_v$. The present invention involves mapping of a collection of points from one space to another space. The mapping is a function or transformation between vector spaces. The first space is commonly referred to as the domain; the second space is commonly referred to as the co-domain. More simply, this will be referred to as the source vector space S, and the target vector space T. The mapping or transformation of points shall be referred to as K, such that we define a mapping as K: S→T. More specifically, since coordinate points are defined relative to a given vector space, we may define the mapping of a collection of points from one space to another as: K: $[P_0]_S \rightarrow [P_1]_T$ where $P_0$ is the original point set and $P_1$ represents the transformed point set. In words, a collection of coordinate points $P_0$ in vector space S is mapped to a new collection of coordinate points $P_1$ in target vector space T via a mapping or transformation K. This is shown graphically in FIG. 1 as a general mapping or transformation K of a collection of coordinate points $P_0$ to a collection of target points $P_1$. Examples of these transformations for different embodiments of the present invention are shown in the chart of FIG. 13. Stated differently, FIG. 13 is a chart of various embodiments for forward mapping and inverse mapping of a collection of source points $P_0$ to a collection of target points $P_1$. Further, row 1 of the chart in FIG. 13 is a general case of FIG. 1.

To determine the affine K matrix transformation from point sets $P_0$ to $P_1$:
 a) $KP_0 = P_1$ Original equation
 b) $KP_0P_0^+ = P_1P_0^+$ Right matrix multiply each side by the pseudo-inverse of $P_0$
 c) $K(P_0P_0^+) = P_1P_0^+$ where $P_0P_0^+$ is effectively Identity, that is $P_0P_0^+ = I$ (with insignificant numerical error)
 d) $KI = P_1P_0^+$
 e) $K = P_1P_0^+$

NON-LIMITING DEFINITIONS

"Actual image points" are a plurality of two-dimensional image points in a vector space that are printed on an imageable substrate and then scanned by a scanner and made available to an imaging device. The actual image points are used to compare to the reference image and/or calibration points and/or other actual image points for see-through alignment.

An "affine transformation" is a transform between two affine spaces which includes a linear transformation followed by a translation. The use of homogenous coordinates allows affine transformations to be easily represented by a matrix K. The matrix K is in affine form and therefore compatible with the standard Composite Transformation Matrix (CTM) format commonly used in computer graphics (as defined, for example, in .NET Framework 3.5) and Printer Description Languages (PDLs) for point and image transformations (for example, in Portable Document Format by Adobe Systems, and PostScript, to name a few). As such, in order to create, enable, and apply affine transformations the individual data points in P must be converted to affine form: $p_n = \{x_n, y_n, 1\}$.

"Alignment errors" are deviations from image-to-image or image-to-sheet that are caused by, for example sheet positioning error, input imaging device positional error, or shrinkage to the imageable substrate such as shrinkage to the paper or mechanical/optical/print head misalignments. Similarly, misaligned scan bars or mechanical paper alignment in the scanning workflow introduce errors in the saved and/or printed document image.

An "inverse" (or "backward") mapping is where the set of points $P_1$ is associated with the source vector space S and the set of points $P_0$ is associated with the target vector space T. There is still a mapping between a source vector space to a target vector space, but the order of point sets is reversed. For example, the matrix equation $K_{01} = P_1 P_0^+$ represents a "forward" mapping, K: S→T, or more specifically $K_{01}$: $[P_0]_S$→$[P_1]_T$. Note that $P_0$ is associated with the source vector space S, and $P_1$ is associated with the target vector space T with regards to direction of mapping or transformation. An "inverse" mapping is defined as: $K_{10}$: $[P_1]_S$→$[P_0]_T$. Mathematically this is accomplished in two ways. The first method is to take the matrix inverse of $K_{01}$, denoted $K_{01}^{-1}$. The second method is to calculate a new matrix by reversing point sets $P_0$ and $P_1$ and creating a new K mapping, $K_{10} = P_0 P_1^+$.

A "calibration image" is a type of reference image point set. The calibration image is a plurality of two-dimensional image points in a vector space. These ideal or calibration image points can be stored in a file and/or printed on an ideal medium and scanned into the system. The ideal or calibration image points are the standard used to minimize distortion and adjust alignment/placement of the image. Typically calibration image includes measureable positions that would be identical to the printed/scanned output if no error was present.

A "customer image" is real-world image such as those on an imageable substrate. These include images created by the scan and/or print process including any errors and distortions caused by the imaging system. A distinction is made between a calibration image used for registration characterization or correction, and a customer image or imageable substrate. Once distortion and alignment errors derived from a registration image are modeled, the correction inverse transformation is calculated as part of a registration or calibration process and subsequently applied to customer images during the RIP or scan process or both. For the Print Path one embodiment is where the inverse mapping pre-distorts and changes alignment such that when the actual forward mapping inherent in the system or other scenario occurs the error cancels out. Similarly, for post-RIP scenario or the Copy/Scan Path the resultant image is corrected post-RIP or post-scan, i.e., not "pre-distorted".

"Control placement" refers to adjusting an imaging device based on total error, for example a scanner and printer whereby the scanner spatial error and printer spatial error are each determined and the digital printer/copier or multi-function device is adjusted accordingly.

A "fiducial mark" refers to a mark defining a datum point or standard of positional reference used as a basis for calculation or measurement.

A "homogenous form" or "homogenous coordinates" are coordinates to allow affine matrix transformations.

An "ideal medium" and "ideal media" refer to the media used as a standard to "control placement" of images by an imaging device (e.g., a printer, digital copier or multifunction device). Alternatively, the terms "reference image" or "reference image points" or "ideal film" or "ideal virtual file" are "ideal media."

An "image" refers to a spatial pattern of physical light comprised of known colors of the light spectrum which are visible by the human eye. When reduced to capture or rendering, the image generally comprises a plurality of colored pixels. A printed image (or image print) would be a photograph, plot, chart, gloss mark, and the like, as are generally known. When an image is rendered to an electronic memory or storage, the values of the color pixels are generally stored in any of a variety of known formats such as BMP, JPEG, GIF, TIFF, or other formats employed for storing image data on a storage media for subsequent retrieval. Received pixels of an input image are associated with a color value defined in terms of a color space, comprising typically 3 color coordinates or axes. Pixels of a received image may be converted to a chrominance-luminance space such as CIELAB or YCbCr.

An "imaging device" or "imaging system" is any device capable of capturing image data as an image capture device and/or for reproduction and display of an image as an image output device. Examples of imaging device are printers, copiers, fax machines, scanners, camera, video devices, and the like. One example imaging system is a multi-function document reproduction system or multi-function machine (scan, copy, fax, and print).

An "image input device" is any device capable of capturing an image such as a scanner or camera or fax machine and providing a signal of the captured image to an image output or storage device.

An "image output device" is any device capable of rendering an image. The collection of image output devices includes xerographic systems, multifunction devices, monitors and other displays, computer workstations and servers, and the like. Image output devices receive a signal of an image and reduce that signal to a viewable form. An inkjet printer is one image output device which receives a signal of an image and renders the image into a viewable form by the visual integration of colored inks deposited onto an imageable substrate. An image output device may incorporate some or all of the functionality of an image input device. An image output device includes printers and multi-function machines (scan, copy, fax, and/or print).

An "imageable substrate" is a substrate such as paper, film, cardstock, photographic paper, Mylar, and other printable surfaces, upon which an image can be rendered.

A "linear transformation" is commonly defined as $Ax=b$, where A is a transformation matrix, x is a vector of source points, and b is the vector of mapped or transformed points. An inverse may be defined as $x = A^{-1} b$. Measured points typically contain a small amount of variation or error. As a result, a noise term should be added to the linear model $Ax=b$. In these cases, a pseudo-inverse is used and denoted with a plus sign as $A^+$. The standard inverse may thus be defined as $x=A^+b$. Note that the inverse is generally applied to the transformation matrix A, and not to the coordinate vectors x and b. In this invention we have two sets of corresponding spatial coordinate points: P relative to a source vector space S and $P_1$ relative to a target vector space T, and we seek to determine the functional mapping, K, between them. In the first standard scenario we apply a pseudo-inverse to a transformation matrix. However, for determining the K mapping we now apply a pseudo-inverse to a collection of coordinate points. The unobvious difference between the standard scenario and the approach used in this invention is that here we will apply an inversion technique to measured, imprecise spatial affine coordinate points versus a function or mapping. Conventionally, we may define this mapping in linear algebraic terms as $KP_0=P_1$ where it is understood that point sets are implicitly related to respective vector spaces, where K becomes an affine matrix transformation, and the term $KP_0$ involves a matrix multiplication.

A "mapping" or "transformation" K is used to represent or correct distortion and alignment errors or other systemic differences between two sets of points, $P_0$, $P_1$. such that $KP_0=P_1$. Alignment may also imply placement of an object relative to another object (for example, image-to-image, image-to-sheet, or sheet-to-device).

"Positional information" refers to a location occupied by a geometric shape on a medium relative to a fiducial mark or coordinate point within the same image.

"Reference image points" are a plurality of two-dimensional image points in a vector space that includes calibration images.

"Registration" is used in document system to describe correct alignment of images on sheets and involves mechanical and imaging adjustments to obtain the best possible results.

The terms "see-through" or "show-through" refer to a relative position of a printed two-dimensional array on one side of a medium to the position of a printed two-dimensional array on the other side of the same imageable substrate.

A "spatial error" refers to the variation in positional information between an ideal medium and a second (scanned, printed, or otherwise transferred) medium. For example, averaging the collection of individual errors for each point is computed to obtain the mean spatial error for the entire imageable substrate.

A "two-dimensional array" or "2-dimensional array" or "2-D array" refers to any grouping of at least one geometric shape throughout the surface of an imageable substrate such as dots spanning a sheet of paper or in a computer file.

Overview of Spatial Errors and Minimizing Distortion

The present system and method detects differences in positional information associated with a two-dimensional array on reference image points and a scan of the same two-dimensional array, so as to isolate spatial errors and minimize distortions caused by imaging systems including scan errors and image output device errors. Differences in positional information associated with a scan are detected and the reference image points of either calibration images and/or customer images by deriving coordinate information from the scan and from the ideal or reference image points. Several examples of mappings for alignment and reduction of distortion are now described. These examples of mappings are applicable to both print and scan paths of an imaging system or imaging device. The mappings are CTM across various subsystems. Prototype with results of these mapping using Mathematica are shown throughout and referenced in the accompanying Appendix.

Align-To-Reference

Figure 2:
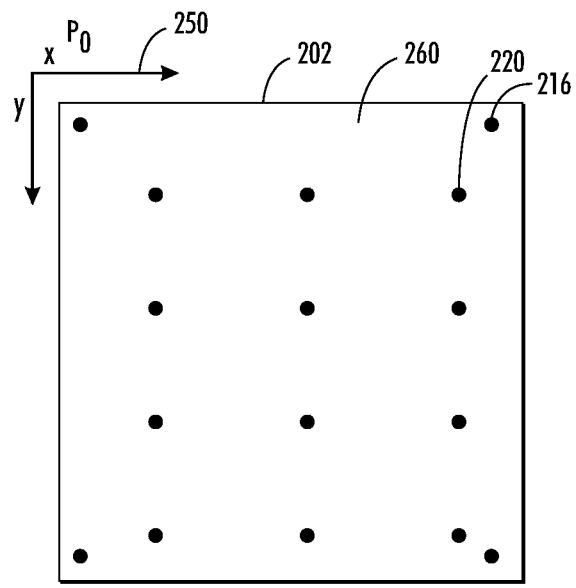
FIGS. 2-3 illustrate two-dimensional arrays as actual and reference image data points used for image registrations.

FIG. 2 illustrates a two-dimensional arrays as actual data points (actual in the sense this is what the imaging device is currently producing) used for image registrations. FIG. 2 is has two-dimensional array 200 printed on an ideal medium 202 with coordinate space 250 as shown. In some embodiments, printer spatial error is determined by using a calibration or reference image data points as part of an ideal medium, such as, a computer readable file or a printed sheet or film. Ideal medium 202 in this example is shown with a two-dimensional array 200 that is defined by a grid of dots substantially covering the ideal medium 202. An example of the two-dimensional array 200 included on the ideal medium 202 is shown in further detail in FIG. 2. For example, in one embodiment, hundreds of dots are arranged to substantially cover the ideal medium 202. The two-dimensional array 200 also can include multiple fiducial marks 216 that can be used for alignment during analysis. For example, the ideal medium 202 can include at least four (4) fiducial marks 216 or bullseyes for alignment of the ideal medium 202.

Figure 3:
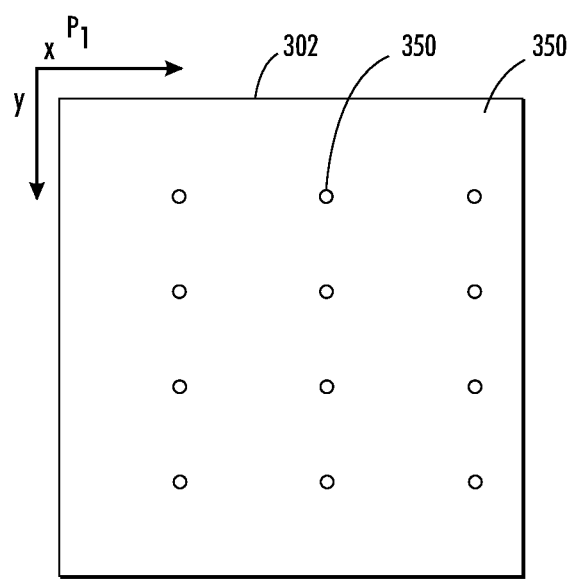

FIG. 3 illustrates two-dimensional array 300 of reference image data points 350 used in image registrations. The reference image data points are the standard or gauge used to place the image.

Figure 4:
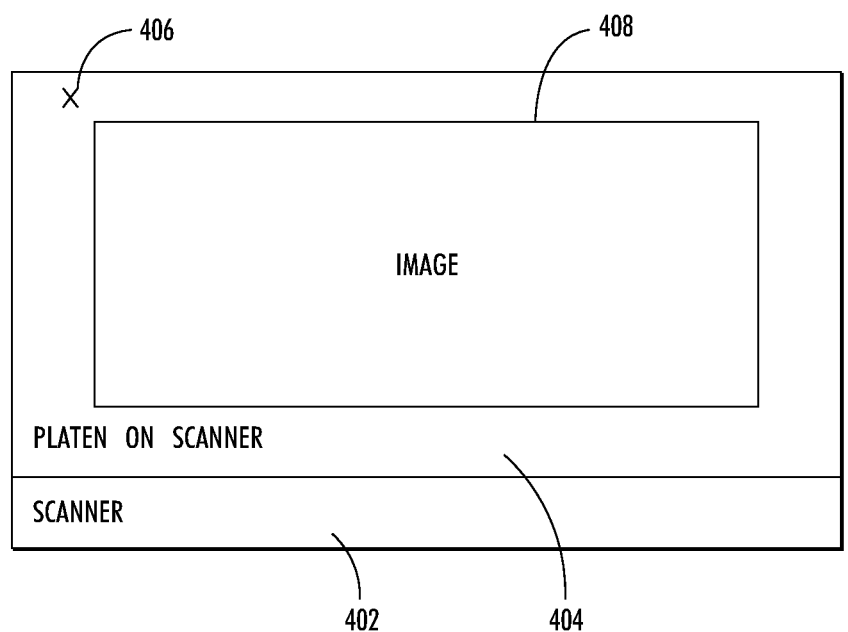
FIG. 4 illustrates an example of using a scanner to capture actual and reference image points used for image registrations.

The embodiment where the ideal medium 202 is scanned from a pre-printed sheet or film is now described. In another embodiment the reference image is accessed from a computer file. Turning to FIG. 4, upon printing, ideal medium 202 is scanned using scanner 402. A location for a ideal medium 202 to be placed on a platen 404 of the scanner 402 is marked so that the ideal medium 202 is placed at a substantially identical location as the registration star mark 406. The ideal medium 202 having the printed two-dimensional array 200 is then scanned. As a result, the two-dimensional array 300 on the sheet 302 is at the substantially identical location on the scanner 402 as an ideal medium 202 to be scanned. The scan of ideal medium 202 is then compared to the reference image of points of the calibration image. If this method is used, spatial errors and other distortions caused by imaging systems including scan errors and image output device errors can be determined, not just printers operatively connected to a specific scanner combined with the architecture of FIG. 15 as described further below.

Using mathematical notation row 2 of FIG. 13 is a mapping between Reference (R) and Actual (A) spaces. Aligning to Reference removes (minimizes) distortions and alignment issues. The forward mapping of a collection of Actual points A to a collection of reference points R, i.e., RA. Also shown is an inverse mapping along with corresponding mappings from AR and the inverse $AR^{-1}$. Here the system introduces error RA, and the correction is AR. Stated differently, first the error is derived RA, and then the error is removed using AR. Mathematically, $$K_{RA}: [P_0]_R \rightarrow [P_1]_A \text{ or } K_{AR}: [P_1]_A \rightarrow [P_0]_R$$

Simplex and Duplex Align-To-Reference

In a duplex printed sheet it is desired and expected that images are aligned correctly on an imageable substrate. A common test is to print a test pattern on each side of a sheet such that with perfect alignment the registration marks will be aligned when the sheet is viewed is a see-through fashion (typically, holding the sheet to a light source so that a customer can visually test alignment).

Figure 5:
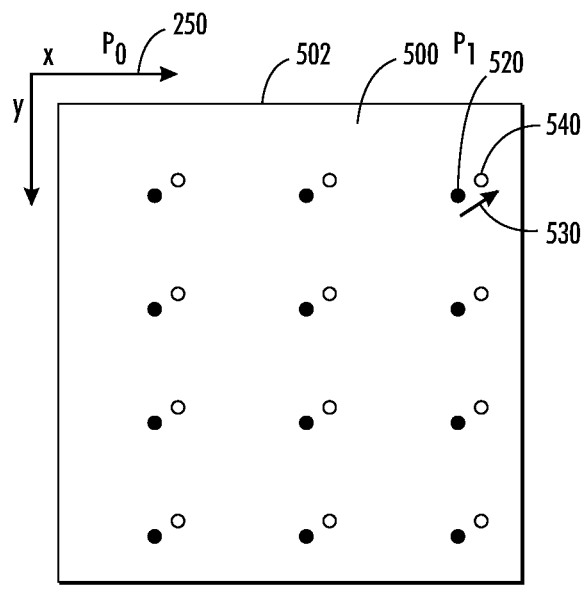
FIGS. 5-8 illustrate spatial errors and corrections to an actual image back to reference images.
Figure 6:
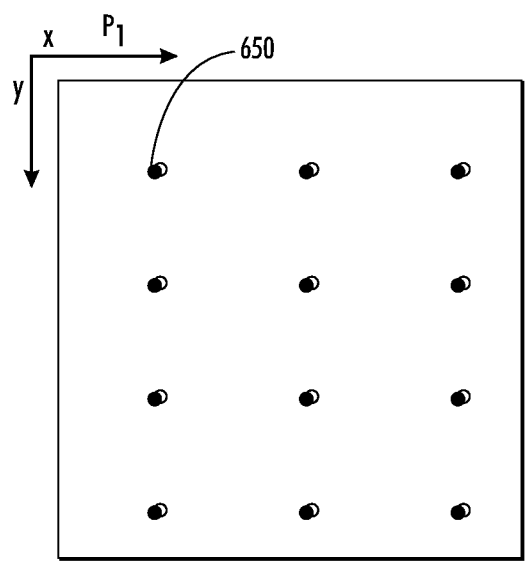

FIGS. 5-8 illustrate spatial errors and corrections to an actual image back to reference images. All the orientations for FIGS. 2-3 and 5-13 are oriented with the 250 X-Y axis kept in the same direction 202. It is important to note that other directions can be used and mappings between different coordinate spaces maybe used. Shown in FIG. 5 is an example of a two-dimensional array 500 typically printed on an imageable substrate such as a printed sheet (not shown). The two-dimensional array 500, includes a plurality of image points shown as geometric shapes 520 and 540. In this example, two geometric shapes are shown a solid circle 520 for the actual measured image points and a reference collection of image points shown as an outline of a circle 540. It is important to note that for measurement purposes the exact size and shape and number of the image points are not important as long as the spatial distance between the centroids of the two image points 520 and 540 can be calculated. Although it has been shown that the number of points affects the accuracy of the fit, testing has shown the fit is still good even with a limited collection of points. During control of image position, corrections are made to adjust for distortion and alignment between these two geometric shapes 520 and 540 so that they align or substantially align 650 as shown in FIG. 6. This is known as Align-to-Reference.

Displacement between spatial 2D points is represented as a displacement vector 530. The amount of registration error is therefore the magnitude of the displacement vector at a particular location for a given pair of points. This is the error for a single point. In another embodiment, the error for an aggregate area across the 2D surface is determined using any combination of total, mean, standard deviation, minimum and maximum errors, histograms and other statistical analysis or function characterizations on the collection of point errors.

Figure 7:
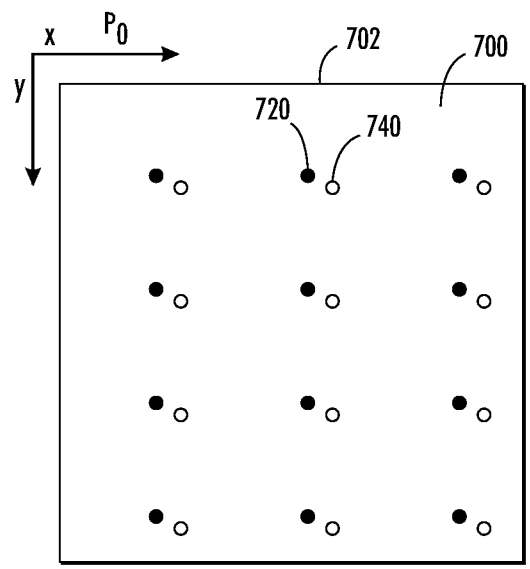

In some embodiments, side 1 to side 2 (e.g., duplex) registration (see-through) are measured using a coordinate system that applies a common reference to both sides of an ideal medium 202. In the case of duplex with see-through alignment to a single reference, this process is repeated for a second side as shown in FIG. 7. The example geometric shapes in this example are solid circle 720 for actual measured image points and outline of a circle 740 for referenced points. In this duplex example of Align-to-Reference there are two possible approaches to the choice of reference sets of image points: Use a common set for both the first side and second side, or an individual collection of reference points for each side. A common collection of reference image points means the reference points 740 for the second side are the same as reference points 740 on the first side. The actual reference points 720 are adjusted to substantially align and remove any distortion 650 to reference points 740 as shown in FIG. 6.

Mathematically, using mathematical notation row 3 of FIG. 13 is a K mapping with a single reference image example to correct for see-through alignment error. A reference image R containing point set $P_0$ is created. This image is printed to both the first side of the duplex sheet or $A_0$, and the same reference image R to second side of the sheet or $A_1$. A set of point $P_1$ is associated with first side and a set of point $P_2$ is associated with second side.

From row 3 of FIG. 13, we have the following:

a) $K_{RA0}$: $[P_0]_R \to [P_1]_{A0}$, or in matrix terms: $K_{RA0}P_0 = P_1$ to model the error b) $K_{RA1}$: $[P_0]_R \to [P_2]_{A1}$, or in matrix terms: $K_{RA1}P_0 = P_2$ to model the error c) Solve for inverse correction mappings or transformations as defined earlier.

$$K_{RA0}^{-1}: [P_1]_{A0} \to [P_0]_R \text{ and } K_{RA1}^{-1}: [P_2]_{A1} \to [P_0]_R$$

d) Apply correction mappings or transformations as defined earlier.

Note that steps c and d generally apply to subsequent applications below as well. For example this is useful for uncorrected see-through alignment, forms and possibly HLC. Further, this is also useful where one actual image is aligned to another actual image, but neither to reference.

Figure 8:
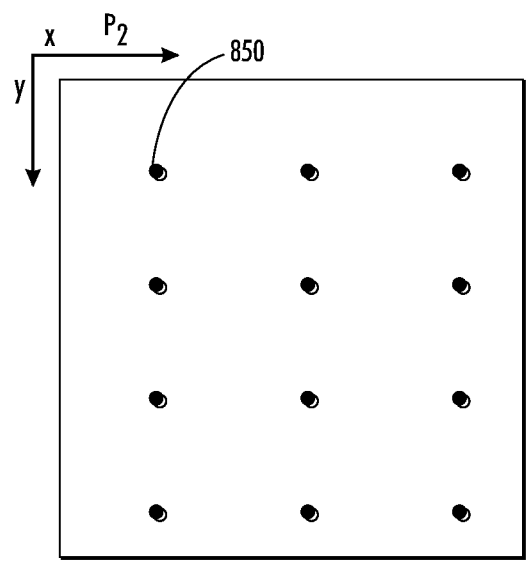

In the case where there are individual sets of reference points, one for each of the first side and the second side, the actual reference points 720 are adjusted to substantially align 850 with the second side reference image points 740 as shown in FIG. 8. More specifically, shown in FIG. 7 is an example of a two-dimensional array 700 typically printed on a second or back side of imageable substrate, where FIG. 5 represents the array on the front or top side of the same imageable substrate. As described above for the first side in FIG. 5, the two-dimensional array 700 of the second side, includes a plurality of image points shown as geometric shapes 720 and 740. In this example, two geometric shapes are shown a solid circle 720 for the actual measured image points and a reference collection of image points shown as an outline of a circle 740. Mathematically, extending the notation of row 3 of FIG. 13, we have the reference for the first side $R_0$ and reference for the second side $R_1$:

a) $K_{R0A0}$: $[P_0]_{R0} \to [P_1]_{A0}$, or in matrix terms: $K_{R0A0}P_0 = P_1$ to model the error b) $K_{R1A1}$: $[P_3]_{R1} \to [P_2]_{A1}$, or in matrix terms: $K_{R1A1}P_3 = P_2$ to model the error c) Solve for inverse correction mappings or transformations as defined earlier.

$$K_{R0A0}^{-1}: [P_1]_{A0} \to [P_0]_{R0} \text{ and } K_{R1A1}^{-1}: [P_2]_{A1} \to [P_3]_{R1}$$

d) Apply correction mappings or transformations as defined earlier.

Actual-To-Actual Duplex Alignment

Figure 9:
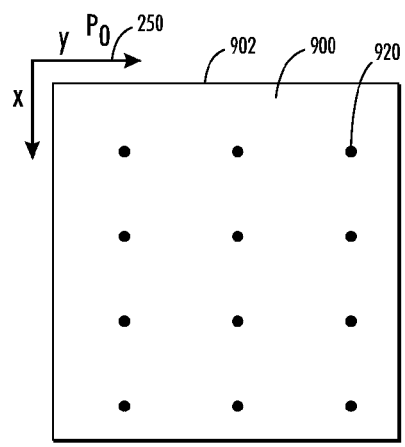
FIGS. 9-11 illustrate spatial errors and corrections to an actual image back to an actual image used in image registrations.
Figure 10:
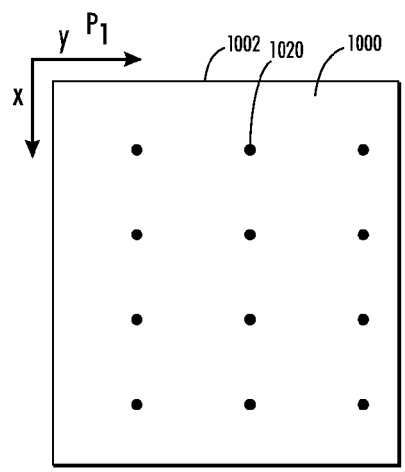
Figure 11:
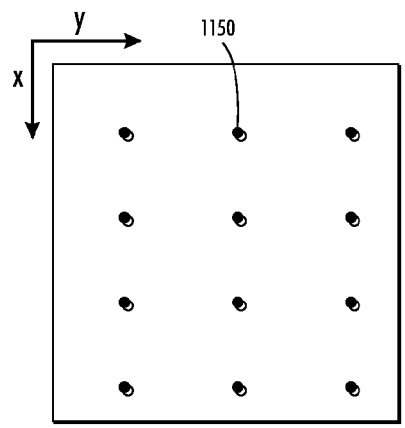

Shown in FIGS. 9 and 10 are examples of a two-dimensional array 900 and 1000 typically printed on each side of an imageable substrate such as a printed sheet (not shown). In this case, there are is a first collection of actual or measured image points 920 for the first side and a second collection of actual or measured image points 1020 for the second side. Stated differently the actual image points 920 on the first side are aligned to the actual image points on the second side 1020. To correct see-through alignment in duplex images, one or both sets of actual image points 920 and 1020 are adjusted to substantially align 1150 as shown in FIG. 11.

Aligning to a relatively perfect reference image(s) both removes distortions and corrects placement. Another approach is to align one uncorrected side to the other. Rather than remove distortions, the distortions from one side are modeled such that the image on the second side is modified to make the image align to the image on the first side. In this case, while distortions are still present they are essentially equivalent so that the distorted images appear visually to be well-aligned when viewed see-through. At typical distortion levels visual inspection would appear to give good registration. It would also involve halving the registration transformation calculations. The algorithm is very fast, so from a computational perspective this would result in only marginal productivity gains. A greater benefit includes reduced registration setup (typically manual) and measurement time, saving on labor effort and associated costs.

Mathematically, using mathematical notation row 4 of FIG. 13 is a K mapping from the algorithm perspective the source space is actual side 0 or $A_0$, and the target space is actual side 1 or $A_1$, K: $A_0 \to A_1$. Alternatively, a mapping in the opposite direction may be performed: K: $A_1 \to A_0$. Actual point sets derived from printing a registration image to each side would be obtained. The K mappings:

a) $K_{A0A1}$: $[P_1]_{A0} \to [P_2]_{A1}$, or in matrix terms: $K_{A0A1}P_1=P_2$ b) $K_{A1A0}$: $[P_2]_{A1} \to [P_1]_{A0}$, or in matrix terms: $K_{A1A0}P_2=P_1$ Note that (b) is equivalent to one method described above for inverses. The other approach of using a matrix inverse on K will be effectively the same. It is important to note as shown in the Mathematica example described in the last section below, during implementation of this align-to-actual embodiment, the align-to-reference transformation of row 3 of FIG. 13 and a similarity transformation is required as well. Such transforms are commonly used to map points in a single coordinate space. The usage here is to map a transformation between spaces. See: *Linear Algebra with Applications* 2$^{nd}$ *Edition*, by Otto Bretscher, *Section* 4.3 *Coordinates in a Linear Space*.

Form Alignment Example

Figure 12:
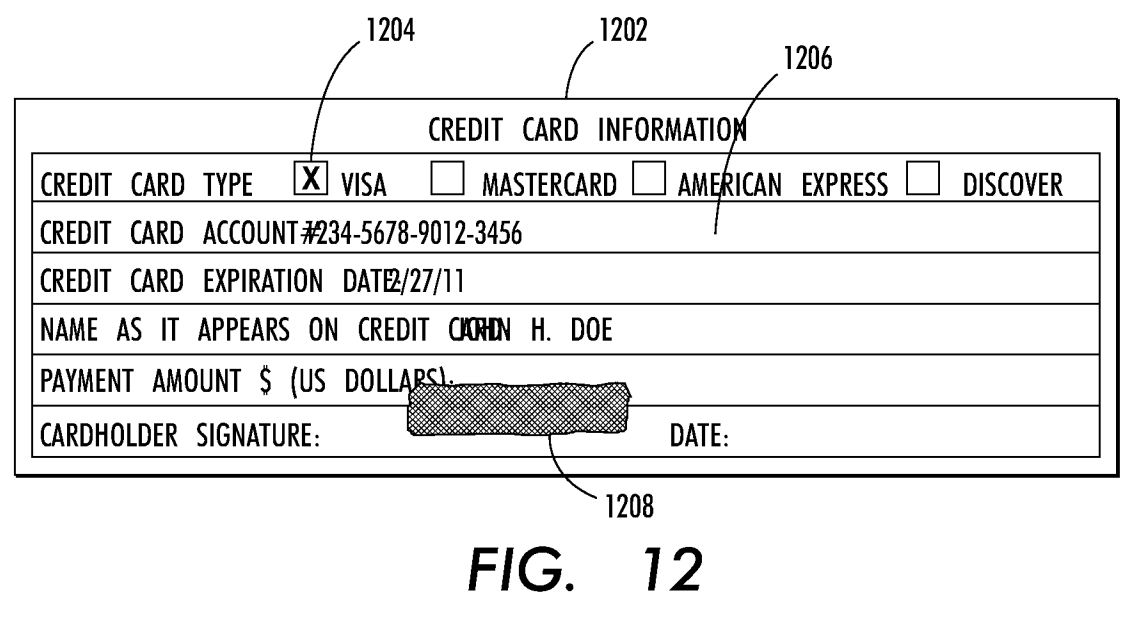

FIG. 12 illustrates spatial errors and corrections to a form used in image registrations. This form can be preprinted in one embodiment, or in another embodiment electronic (e.g., a pre-printed form that is scanned). In certain cases these forms are also known as variable input forms (VIP) where some of the information changes, such as a name, but the body of the letter remains consistent. For example, credit card form 1202 is shown with information printed on the form. Notice the type of credit card 1204 is checked but because of poor alignment the word Visa is partially obscured. Likewise the text 1206 is shown not position correction with respect to the lines. Also, the highlighting 1208 is mis-aligned to the corresponding line. Using the alignment to actual transformation because forms have errors. The goal is to map the actual/distorted forms. In example case above, all these misalignment problems are minimized as further described below. A common printing application is print images onto pre-printed forms. The form may be misaligned in the paper path, and/or the form image-to-sheet alignment is off. Or the form may be distorted due to anomalies in the device it was originally printed on. This is a different scenario from loading the form as a printable substrate in the final printing. In the embodiment where the form is a preprinted form as opposed to an electronically stored form, the form may experience shrinkage as part of the fusing process, and so forth. Recall there are two possible sources of shrinkage with a pre-printed form. The first source of shrinkage is due to original fusing and the second source of shrinkage is due to final fusing.

Mathematically, using mathematical notation row 5 of FIG. 13 is a K mapping, the form becomes the source space F (which is a kind of actual $A_0$) and the actual point set derived from printing a registration reference image to a sheet side $A_1$ and both are used to define the mapping $K_{FA1}$. This is simply a special case of above of Actual-to-Actual alignment where the form F was printed previously. To obtain form registration point sets either the form maker would include this or in certain cases it could be derived via the form itself. The customer image to be printed onto the form is manipulated so as to fit onto the imperfect, distorted form (e.g., the form has skew, shift, and stretching error that will be adapted to). The K mappings would be either (a) or (b):

a) $K_{FA1}$: $[P_1]_F \to [P_2]_{A1}$, or in matrix terms: $K_{FA1}P_1=P_0$ b) $K_{A1F}$: $[P_2]_{A1} \to [P_1]_F$ or in matrix terms: $K_{A1F}P_2=P_1$ Highlight, Layer or Engine Alignment This approach is very similar to the Form Alignment Example above, however instead of alignment to form, a highlight color, color layer or marking engine alignment in an imaging system (comprising multiple imaging subsystems and/or devices) is now being aligned and corrected. This involves overlaying one image on top of another. Registration errors are unusually present because of imaging or mechanical alignment anomalies. Typically multiple marking engines are used in a sequential fashion where each engine marks/overlays an image. As in the earlier examples, images may all be aligned to a common reference, or alternatively, to an actual image produced by one of the marking engines. As such this is a special application of reference-actual or actual-actual distortion and alignment correction on a per side basis. Printing could be simplex or duplex, but related images are typically not see-through but rather from disparate printing engines in the print path. Of course this does not mean see-through alignment for duplex scenarios is no longer important. Any number of marking engines may be chained together (only 2 are shown in FIG. 13). Further, any number of passes for one or more engines is also within the true scope and spirit of the present invention.

For Highlight Color (HLC) and similar applications typically multiple engines mark multiple image Layers onto a sheet. Transformations are modeled as above and can use either the Align-to-Reference or Align-to-Actual transformations (corrected or uncorrected). Here only Align-to-Actual is shown (e.g., align all layers to first layer marked on first engine in a sequence of engines). An Align-to-Reference alternative would follow as above where all actual images for each engine/layer are mapped back to a common reference and are thus both aligned across engines and corrected to reference.

As before points P are relative to spaces R or A, but are now qualified relative to which marking engine E is used. Following convention, another collection of nesting brackets are used. For example, the points $P_n$ are marked as an actual image $A_n$ on engine $E_n$ would be: $[[P_n]_{An}]_{En}$.

Mathematically, using mathematical notation row 6 of FIG. 13 is a K forward mapping with an engine denoted $E_n$:

a) $K_{A0A1}$:$[[P_0]_{A0}]_{E0} \to [[P_1]_{A1}]_{E1}$, or in matrix terms: $KR_{A0A1}P_{0A0E0}=P_{1A1E1}$ (Align-to-Reference)

b) $K_{A1A0}$: $[[P_1]_{A1}]_{E1} \to [[P_0]_{A0}]_{E0}$ or in matrix terms: $K_{A1A0}P_{1A1E1}=P_2$ (Align-to-Actual)

Note the additional bracketing included to show that point sets are relative to reference or actual spaces, which in turn are relative to a particular engine. Similar K mappings are possible and straightforward for duplex side 2 using $A_1$.

High Level Flow Diagram

Figure 14:
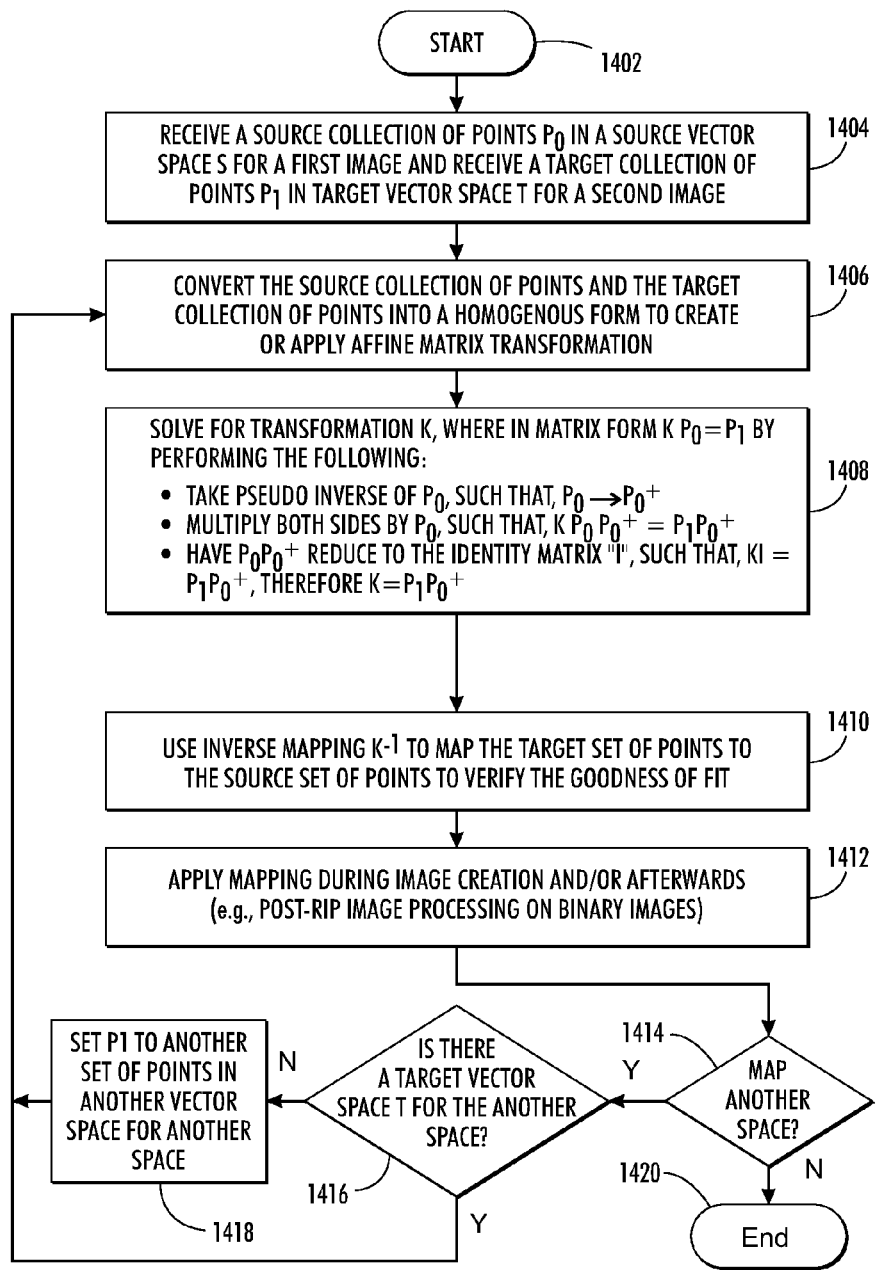
FIG. 14 is a flow diagram for correcting the errors in FIGS. 5-13 according to an embodiment of the present invention.

FIG. 14 is a flow diagram for correcting the errors in FIGS. 5-13 according to an embodiment of the present invention. The process begins at step 1402 and immediately proceeds to step 1404 where a source collection of image points $P_0$ in a source vector space is received. Also received is a target of image points $P_1$ in a target vector space. These source collections of points are the domain two dimensional (2D) spatial coordinate points and the target collection of points $P_1$ are the mapped co-domain.

Next is step 1406, the source collection of 2D image points and the target collection of 2D image points are converted into a homogenous form to create or apply affine matrix transformations.

In step 1408, the process solves for transformation K, where in matrix form K $P_0=P_1$ by performing the following:

Take pseudo-inverse of $P_0$, such that, $P_0 \to P_0^+$

Right multiply both sides by $P_0^+$, such that, $KP_0P_0^+=P_1P_0^+$; and

Have $P_0P_0^+$ reduce to the Identity Matrix "I", such that, $KI=P_1P_0^+$, therefore $K=P_1P_0^+$.

In step 1410, the inverse mapping $K^{-1}$ is used to map the target collection of homogeneous coordinate points to points in the domain or original source coordinate space to verify the goodness of fit by comparing to original points. Recall that the pseudo-inverse in conjunction with matrix algebra produces an optimized fit. If the coordinate point information in each space and mapping/transformation were completely accurate the results would be equivalent to using normal matrix algebra. That is, the mapping/transformation in matrix form was invertible using matrix inversion. Further, the points in the co-domain or target space are mapped with no significant error. Implicit in the use of this method is a more robust forward/inverse mapping assuming some variability in the mapped coordinate points which disables the ability to use a standard matrix inverse. Matrix inversion of homogeneous coordinate points is not meaningful in this context outside of enabling subsequent matrix algebra that exposes the K mappings. Mappings maybe applied in step 1412 during image creation and/or afterwards (e.g., Post-RIP).

The flow may repeat if there is another space to map, such as a second color or print head, or side of imageable substrate. In step 1414, a test is made to determine if there is another space. In the event there are no other spaces to map, the flow ends in step 1420. In the event coordinate points for another space are available, the process continues to step 1416 to test if another collection of coordinate points will be used. If not the flow continues up back to step 1406. In the event another collection of coordinate points will be used, the flow continues to step 1418 to set $P_1$ to another collection of 2D image points in a another vector space, that is different from the source and target spaces, for another space before continuing to step 1406.

System Architecture and Application of CTM to Various Subsystems

More specifically, the transform or mapping matrix K described above can be thought of a CTM matrix i.e., a composite of rotation, scaling, translation, and shear. It is an affine matrix in computer graphics form. As such it is readily consumed by computer graphics-oriented or Printer Device Language (PDL) products and software libraries. Examples include Postscript, graphics accelerator cards, and any computer graphics package such as OpenGL, Windows.NET, and Java. Typical registration setup routines require discrete values for rotation, scaling, translation and possibly shear. Techniques previously discovered and developed may be used to decompose a given CTM matrix into rotation, scaling, translation and shear values. Further information, on the mathematical correction performed by the present invention are in CTM form and therefore readily consumable by e.g., Postscript, image processing, and computer graphics cards, and can be decomposed into discrete operations. This decomposition is described in four U.S. patent application Ser. Nos. 12/338,260, 12/338,300, 12/339,148 and 12/338,318 all filed Dec. 18, 2008, each entitled "Method And System For Utilizing Transformation In Process Rasterized Image Data", and commonly assigned herewith to Xerox Corporation and the teachings of each incorporated herein by reference in its entirety including any continuations, and continuations-in-parts thereof describing shear. As important is the order of decomposition results because operations are non-commutative (e.g., a rotation followed by a scaling will give different results than a scaling followed by a rotation for same values of rotation degree and scaling factors). For mechanical and xerographic registration operations the order is specific and device-dependent, so the decomposition will typically require reordering of transformations so that they are aligned with real behavior of the system (less of a constraint for purely graphical operations). Further, registration requires handling small angle rotations (versus orthogonal {0, 90, 180, 270} degrees) and shear which the decomposition algorithms are able to provide. This present method and system expands on the inventors previously developed algorithms to obtain the decomposition as required by registration.

The CTM above allows for forward mapping, for example from Reference-to-Actual, and inverse mapping from Actual-to-Reference. Decomposition may be applied to both directions. Decomposing the forward transformation yields insights into what transpired to produce the observed distorted result. Note that this depends upon the uniqueness of the decomposition step, and appropriate reordering to mirror actual workflow. Decomposition of the inverse transformation, from Actual-to-Reference, produces the discrete values needed for mechanical and xerographic registration setup. For the example shown in the attached, alignment prior to marking involves rotation and translation, and the marking/fusing step causes scaling/shear distortions. An alternative would be to align via translation first, then the rotation, but since the fusing step is last scaling/shear distortions are typically last unless the translation step is also done in the xerographic subsystem via imaging vs. mechanical shifting. The reordering of the decomposed matrices must reflect the actual processing order inherent in a particular product. Note that the execution location of each of the decomposed operations is a design choice and the full collection of decomposed operations may be distributed.

It is important to note that there are two sources of CTMs. One source of CTMs, which is an embodiment of the present invention, is used to model the imaging device due to device imperfections. A second common source of CTMs is discrete graphics operations requested by the remote user or printer operator. Theses two kinds of CTMs can be combined using the present invention.

Figure 15:
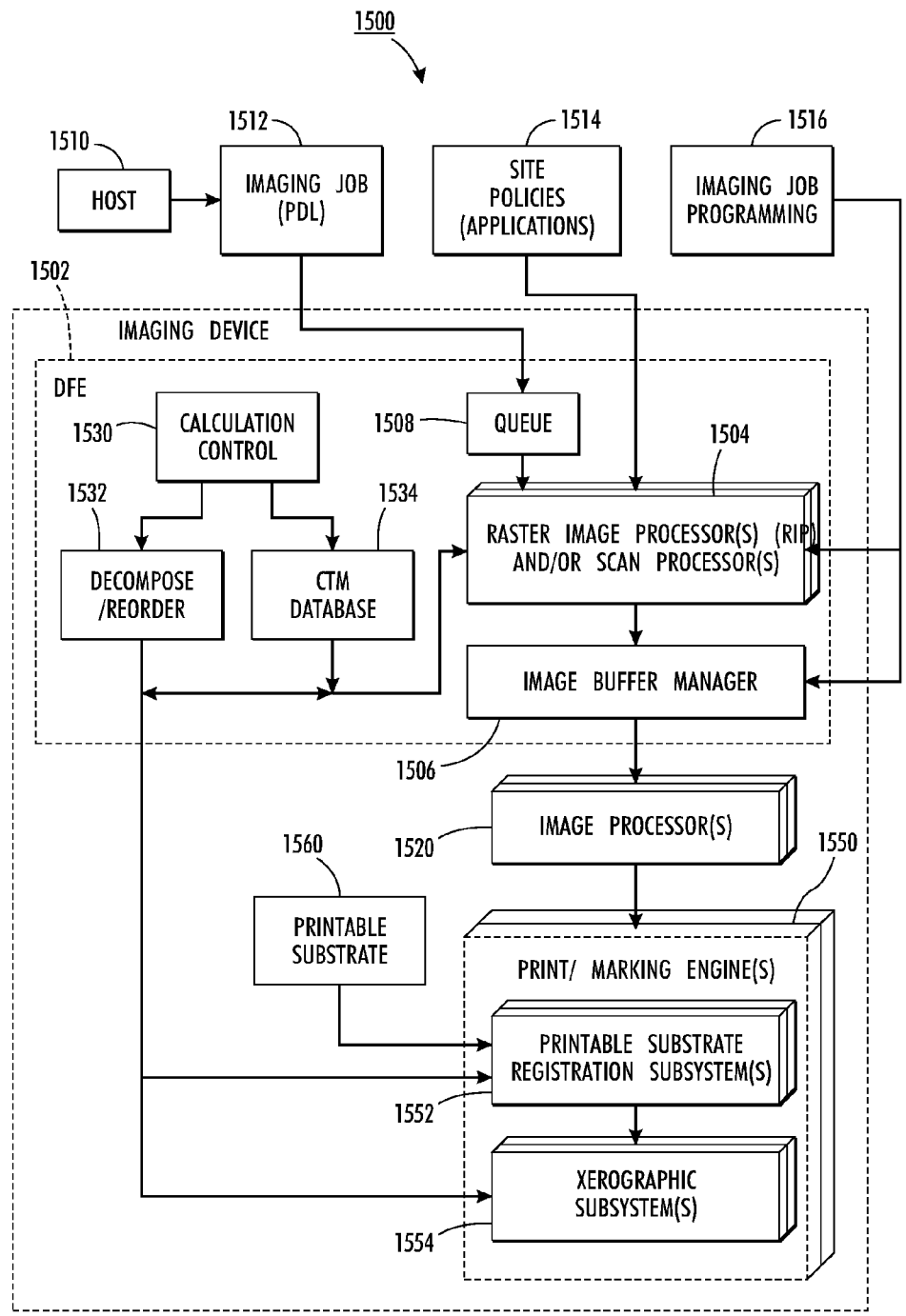
FIG. 15 is a system diagram of the used to carry out the flow of claim 14, according to an embodiment of the present invention.
Figure 16:
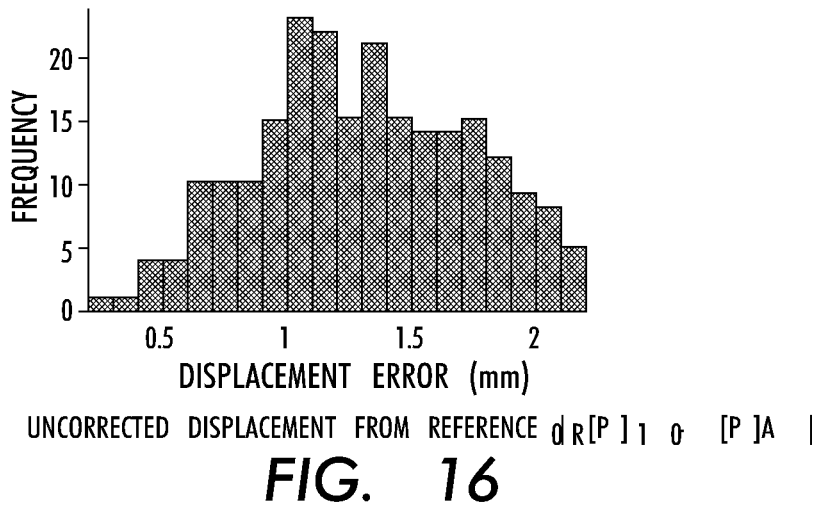
FIGS. 16-24 are a series of histogram plots computed by a mathematical model of the flow of FIG. 14 on the system of FIG. 15, according to an embodiment of the present invention.
Figure 17:
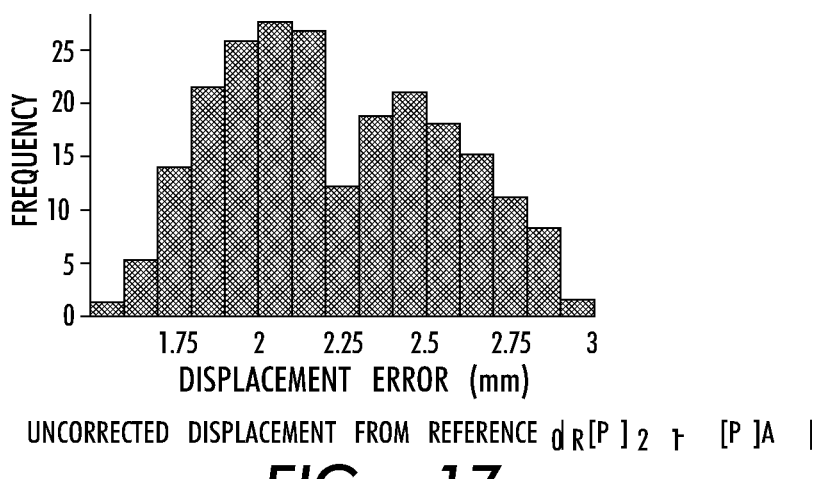
Figure 18:
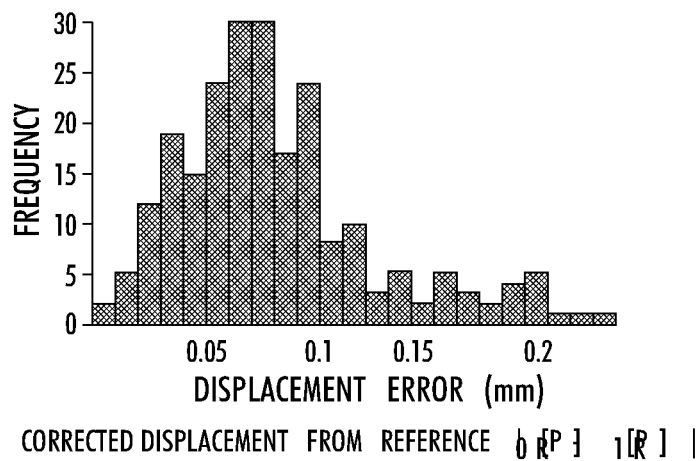
Figure 19:
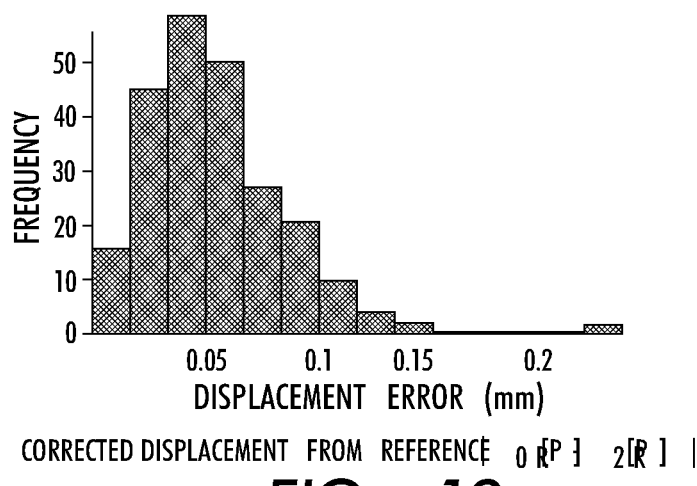
Figure 20:
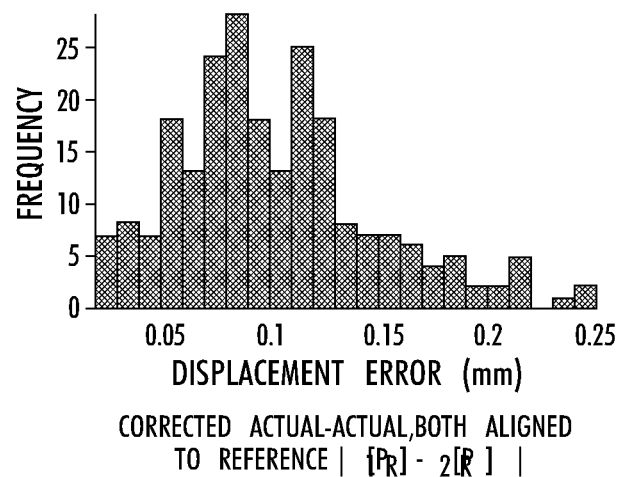
Figure 21:
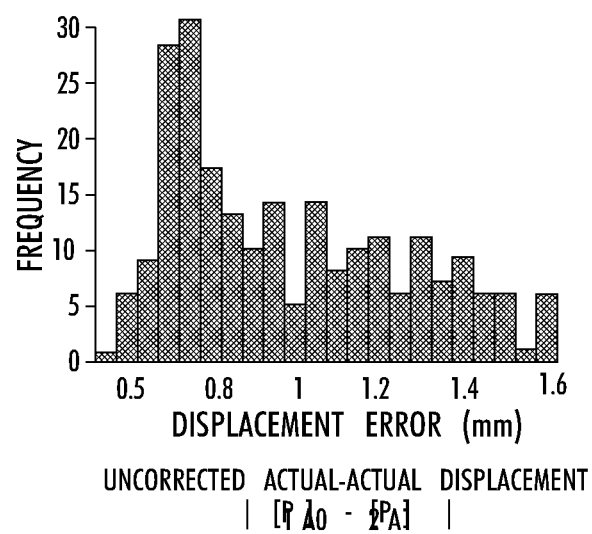
Figure 22:
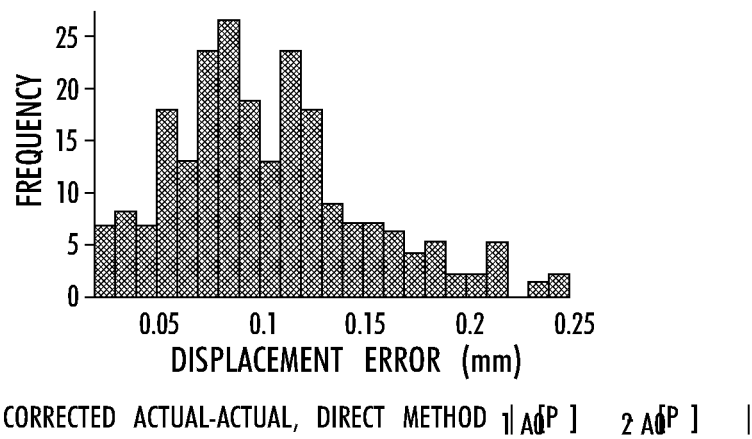
Figure 23:
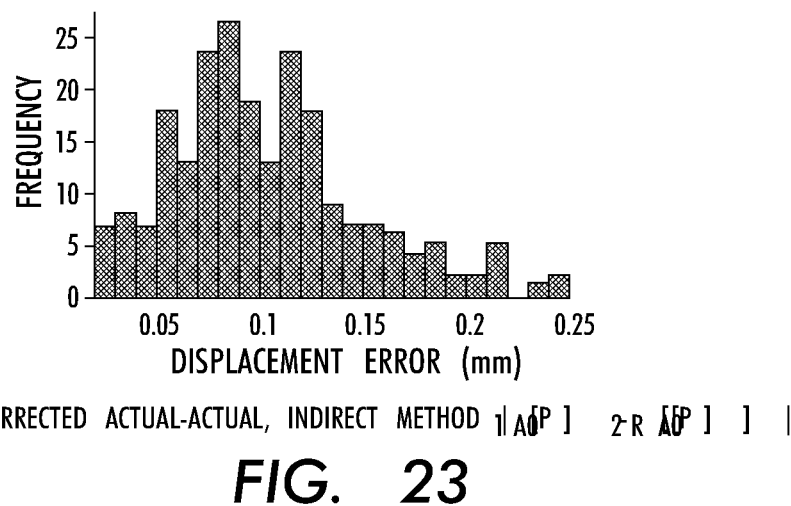
Figure 24:
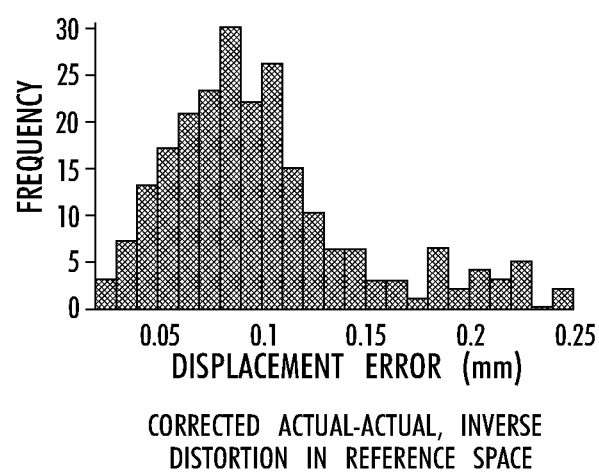

FIG. 15 is a system diagram of the imaging device used to carry out the method of FIG. 14, according to an embodiment hereof, illustrating an exemplary image path for printing, scanning, copying or a combination of each of these operations in an imaging device 1500. Distortions are minimized and spatial errors are corrected across possibly different subsystems within an imaging device, such as a printer, multifunction machine, scanner, fax, copier or other system. The manipulations include the image transformations of translation, rotation, scaling, and shear.

The imaging device 1500 in accordance with one or more aspects of the present disclosure, comprises one or more Raster Image Processor(s) (RIPs) and/or scan processor(s) 1504 associated with an image buffer manager 1506 communicatively coupled to a print engine(s) 1550 that print images on a printable media or printable substrate 1560 introduced thereto. For scanning or copying or faxing operations, the job may not be printed but rather put in an imaging buffer manager 1506 for later use such as e-mail, local or remote storage, and more non-printing functions. The term "scanning" is used in this description to mean scanning, copying or faxing.

The imaging device includes a digital front end 1502 (DFE) having calculation control 1530 and a transformation data in a Composite Transformation Matrix (CTM) database 1534 with decompose/reorder module 1532 for applying transformation on images over one or more subsystems of RIPs and/or scan processor(s) 1504, one or more image processor(s) 1520 and print engine(s) 1550 according to the present invention. Although the image processor(s) 1520 are shown outside the DFE 1502, it in this embodiment, in other embodiments the image processor(s) 1520 are inside the DFE 1502. The CTM database 1534 includes data to handle translation, rotation, scaling, and shear. The DFE 1502 may include additional RIP instances (not shown), such as a Post- Script RIP, a PCL RIP, etc., wherein each RIP instance is operatively coupled with corresponding multiple imagers. Furthermore, a single print job may be processed by two or more RIP instances of the same type (e.g., page parallel RIP). The print engine(s) 1550 may include separate color and monochrome engines that work cooperatively under the control of more than one image processor(s) 1520. For example, many times different image processors are used to perform separate tasks, e.g., translation/rotate and another to perform compression, although not a requirement of the disclosure. In another possible implementation, for example, two or more color imagers could be provided with a single component RIP and/or scan processor(s) 1504 in a DFE 1502, where one of the imagers is associated with a print engine having a lower print cost than a print engine associated with the other imager. Still another possible example includes two or more monochrome imagers associated with print engines having different associated print costs. The imaging device 1500, moreover, can have a modular architecture that allows print engine(s) 1550 to be interchanged with other print engines, wherein some engines may be adapted to produce color printed images while others may be limited to monochrome imaging. The DFE 1502 includes an image buffer manager 1506 for managing output from the RIPs and/or scan processor(s) 1504 being fed into the print engine(s) 1550. Although the image processor(s) 1520 is shown as part of the imaging device 1500, it is important to note that the image processor(s) 1520 may be in multiple places within the image path and/or divided into more than one image processor. Image processor(s) may be utilized, for example, to aid in the rendering part of RIP (in-RIP), post-RIP when reprinting, and in the print engine(s) 1550.

The CTM database 1534 in one embodiment stores calibration information to different imageable substrates e.g. different sheet sizes, different sheet weight, and other system/printer/scanner/copier/multifunction device variables. For example, there would be different CTMs for 11×17 with two different weights. Calibration for different configurations and variables are associated with a given CTM. Stated differently, the use of the CTM database 1534 provides associated information and metadata describing the information in a database record for a CTM. Suppose a run-time scenario a imaging job comes in for a request for given imageable substrate, the image system 1500 is configured based on these requirements and the corresponding CTM is retrieved from the CTM database 1534 and configures the incoming job to run it in Postscript. The CTM can be applied at different subsystems in the imaging system 1500.

The print engine(s) 1550 may be any device or marking apparatus for applying an image from the DFE 1502 to printable substrate (print media) 1560 such as a physical sheet of paper, plastic, or other suitable physical media substrate for images, whether precut or web fed. The print engine(s) 1550 generally includes hardware elements employed in the creation of desired images by xerographic processes and may also include ink-jet printers, such as solid ink printers, thermal head printers that are used in conjunction with heat sensitive paper, and other devices capable of printing an image on a printable media 1560.

The DFE 1502 can be any suitable hardware, software, or combinations thereof, whether a unitary system or a plurality of systems implementing the front end functionality in distributed form to provide an interface between submitting host 1510 providing incoming image job(s) 1512 and the print engine(s) 1550 in the print path or scan processors 1504 in the scan path. In one embodiment, the print path for the imaging device 1500 can be any form of commercial printing apparatus, copier, printer, scanner, fax machine, or any other printing system with one or more print engine(s) 1550 by which visual images, graphics, text, etc. are printed on a page or other printable medium 1560, including xerographic, electro photographic, and other types of printing technology, wherein such components are not specifically illustrated to avoid obscuring the various alternate imaging features of the present disclosure.

FIG. 15 includes a queue 1508 having various hardware memory, disk drives, or other storage apparatus by which one or more incoming print/scan/copy/fax, i.e., MFD jobs 1512 can be received from a computer or other host 1510 and stored, in whole or in part, for processing by a RIPs and/or scan processor(s) 1504. The scan or copy can be local or remote to imaging device 1500. The scan/copy typically produces a PDF file or an image file, such as TIFF. The print path can consume PDFs that get RIPped into images, including TIFF. For example, the image job 1512 may be generically PDL or specifically PDF in the case of printing. Likewise, in the case of scanning or copying, the image job 1512 may be PDF or TIFF. In one embodiment, the RIPs and/or scan processor(s) 1504 operates in concert with the queue 1508 to process incoming print jobs 1512 to thereby create RIPped or scanned objects, which are stored in an image buffer manager 1506 of the DFE 1502. Calculation control 1530 in association with Composite Transformation Matrix (CTM) database 1534 and decompose/reorder module 1532 provides image operations of translation, rotation, scaling and shear using one or more CTMs at various subsystems within imaging device 1500. Some subsystems such as the RIPs and/or image processor(s) 1504 can consume CTMs directly and do not need to consume discrete values after decompose/reorder. However, the print engine(s) 1550 as part of the print path of imaging device 1500 typically cannot consume CTMs directly and must have these CTMs broken down through decompose/reorder module 1532 into discrete values.

In one embodiment, objects which are scans, faxes, or copies are saved to a computer readable file and processed to remove distortions and misalignments. In another embodiment, imaging jobs commonly RIPped/scanned into the image buffer manager 1506 are processed by image processor(s) 1520 to produce raster page images for use by print engine(s) 1550. In the print engine, a printable substrate registration subsystem 1552 aligns the printable substrate 1560 for image formation on xerographic subsystem(s) 1554. In one embodiment, this distortion removal and alignment may be corrected using CTM database 1534 entries that have been decomposed and reordered 1532 and applied to either the paper registration subsystem(s) 1552 or the xerographic subsystem(s) 1554 or both. For example, rotation/skew and/or translation/shift would typically be for printable substrate alignment such as paper alignment i.e., squaring up the paper in the printable registration subsystem 1552. Whereas in the case of scaling and/or shear, these operations would probably be handled via imaging techniques employed at the xerographic subsystem(s) 1554. However, it is important to note that these image transformations can be done in other subsystems within the imaging device 1500 as well. Registrations in imaging devices such as printing systems are described with reference to FIG. 15.

Imaging device 1500 can receive job programming 1516 at the user application level. For example, a job may include rotating an image by 90, 180, or 270 degrees, scaling up or down the image, or translating/shifting the image in one or more directions. Job programming 1516 is handled by RIPs and/or scan processor(s) 1504 or at image processor(s) 1520.

For example, during or after RIP or scan a translation and/or rotation is performed according to the user application in order to accommodate a printable substrate 1560 with 3-holes punched along one side.

It is important to note that the present invention overcomes a common problem of image processing cards in a document imaging device not working well with small rotation angles that are smaller than 90 degrees, e.g., 1.6 milliradians rotation angle. The present invention enables "small angle rotations" typically adjusted in the registration subsystem(s) along with shear corrections. Alternatively, more powerful/flexible image processors or computer graphics cards (uncommon in a typical document imaging device) may also handle small-angle rotations and shear.

In another embodiment, job programming 1516 and CTMs from CTM database 1532 under calculation control 1530 are combined at RIPs and/or scan processor(s) 1504 and/or combined at the image processor(s) 1520 or a portion of the transformation applied at both the RIPs and/or scan processor(s) 1504 and image processor 1520. The process of decomposition/reordering image transformations 1532 using CTM has been referenced above. Using the architecture of the present invention, it is possible to combine several different sources of adjustment to the imaging device 1500. This combination of adjustments can be made in both the print path and the scan path. For example in the print path, adjustments can be made by both the user applications specified by job programs 1516 and the site policies 1514. This combination of adjustments can be further combined with compensation made to adjust the print engine(s) 1550. Likewise, in the scan path, adjustments can be made by both the user applications specified by job programs 1516 and the site policies 1514 to be combined with compensations made to adjust the scanned image to remove scanner inherent distortions/misalignments.

In one embodiment an automatic calibration routine is run based upon site policies. For example, a calibration is automatically run in response to determining that the tolerances for errors and distortion of the machine 1550 are outside a given site policy.

Adjustments can be further combined to adjust the scan engine(s) (not shown). The present system and method permits adjustments to be made in various places. In one embodiment, the compensation/adjustments are made, wherever they occur, in order to correct for inherent systemic errors in the device. Further these adjustments/compensation can be a pure correction, applied e.g., at RIP-time, dynamically for each image generated. In another embodiment these adjustments/compensations could be more static as controlled by the "machine setup" for printable substrate registration subsystem(s) 1552 and xerographic subsystem(s) 1554. For example, the job programming specifies a 90 degree rotation and calculation control 1530 compensates for a 0.5 degree rotational error in the print engine(s) 1550. These are two transformations of 90 degrees and 0.5 degrees. Transformations can be combined or composited then decomposed and the decomposed operations can be distributed across 4 regions of device 1500 as desirable. These four distinct regions are: i) the RIP(s) and/or ii) scan processor(s) 1504, iii) the image processor(s) 1520; and/or iv) the print engine(s) 1550. Further, the print engine(s) 1550 broadly has at least two distinct subsystems where these transformations can be applied individually or together i.e., the paper (imageable substrate) registration subsystem(s) 1554 and xerographic subsystem(s) 1552 in the print engine(s) 1550. Applying the transformation at RIPs and/or scan processor(s) 1504 allows print changes to be addressed for a specific imaging device 1500. These print changes many times are independent of image quality problems, which is desirable. On the other hand, applying the transformation at RIPs and/or scan processor(s) 1504 or scan time results in the machine-specific corrections/transformations to become part of the image i.e., "baked into the image" independent of image quality problems. Therefore, transformations applied during RIP are no longer independent of the print engine; rather these transformations are dependent on the calibration to the specific engine.

Further, applying the transformation at image processor(s) 1520 allows print quality issues to be addressed across various imaging device i.e., the correction transformation is no longer device dependent to the original device or an outdated device state (e.g., drift since machine registration was calibrated). For example, a correction that is not "baked into the image" could be reprinted from storage to another imaging device that would apply its own device dependent correction to remove the errors on that remote device.

Still, further, applying at the print engine(s) 1550 allows the alignment issues such as those due to paper quality, types of print media for the printable substrate 1560, color overlays, one and two-side printing alignment, see-through through alignment, align to form, aligning images/paper to be handled very precisely. Printer engine 1550 adjustments allow for corrections to be made possible in a multi-engine environment e.g., HLC—highlight color and more.

It should be understood that the architecture described in FIG. 15, with calculation control 1530 and CTM database 1534 along with decompose/reorder module 1532 allows site policies 1514, job programming 1516 and image quality corrections to be combined and applied together or independently over one or more subsystems of RIP(s) and/or scan processor(s) 1504, image processor (s) 1520 and print engine(s) 1550 according to the system and method hereof.

In another embodiment in which the imaging device 1500 has limited computational capacity, such as a multifunction device (copy, scan, fax, printer), the error correction and alignment of imaging device 1500 is performed on a separate computer that is external to imaging device 1500. In this embodiment, the error of the imaging device 1500 is captured as part of a registration setup by a customer or a technician. This error is gathered by the personal computer for analysis and computation of the CTMs. The resulting CTMs are then transferred from the personal computer to the imaging device 1500.

Prototype Using Mathematica

FIGS. 16-24 are a series of histogram plots computed by mathematical model the flow of FIG. 14 on the system of FIG. 15, according to an embodiment of the present system and method. Note that mapping points results in a new set of points. As a simplification for the histograms a new convention is introduced. Points are explicitly defined relative to a particular space, for example: $[P_2]_{A1}$. For or the histograms, rather than show a new set of points (e.g. $P_3$) the space the points are mapped to is changed instead. This implicit mapping is conceptually simpler. For example, mapping $P_2$ from $A_1$ space to $A_0$ space would be represented as follows: $[P_2]_{A1} \rightarrow [P_2]_{A0}$. For programming reasons new point variables are needed and defined in the actual prototype code. Further note the use of absolute value symbols (e.g., "|x|") surrounding the equations to denote vector magnitude. Since P is a set of points, the absolute value in this context means finding the vector displacement magnitude for each point in the collection. This model was implemented in Mathematica by Wolfram Research in appendix entitled "Appendix Mathematica Prototype".

Non-Limiting Examples

It should be understood that the flow diagrams depicted herein are illustrative. One or more of the operations illustrated in any of the flow diagrams may be performed in a differing order. Other operations, for example, may be added, and operations may be modified, enhanced, condensed, integrated, or consolidated. Variations thereof are envisioned and are intended to fall within the scope of the appended claims.

It should also be understood that the method described in the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, leverage specialized programs or leverage off-the-shelf computer graphics software such as that in Windows, Java, or from a server or hardware accelerator or other image processing devices.

The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system.

One or more aspects of the methods described herein are intended to be incorporated in an article of manufacture, including one or more computer program products, having computer usable or machine readable media. For purposes hereof, a computer usable or machine readable media is a medium containing machine readable instructions, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein.

Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications are each separately hereby incorporated by reference in their entirety.

What is claimed is:

1. A computer-implemented method to control placement of an image on an imaging device, the method comprising:
    receiving a source collection of a plurality of two-dimensional image points in a source vector space for a source image and a target collection of a plurality of two-dimensional image points in a target vector space for a target image, wherein the source collection of the plurality of two-dimensional image points and the target collection of the plurality of two-dimensional image points are different due to errors in the imaging device;
    converting the source collection of two-dimensional image points and the target collection of two-dimensional image points into a homogenous form to enable and apply affine matrix transformations;
    solving for a matrix transformation to map the target collection of the plurality of two-dimensional image points to the source collection of the plurality of two-dimensional image points, wherein the matrix transformation is one of an inverse matrix transformation, and a reverse mapping; and
    adjusting, using the matrix transformation, at least one of distortion and alignment of the target image to control placement of the target image in an imaging device.

2. A computer-implemented method to control placement of an image on an imaging device, the method comprising:
    receiving a source collection of a plurality of two-dimensional image points in a source vector space S for a source image and a target collection of a plurality of two-dimensional image points in a target vector space T for a target image, wherein the source collection of the plurality of two-dimensional image points and the target collection of the plurality of two-dimensional image points are different due to errors in a system;
    converting the source collection of two-dimensional image points and the target collection of two-dimensional image points into a homogenous form to enable and apply affine matrix transformations;
    solving for a matrix transformation to map the source collection of the plurality of two-dimensional image points to the target collection of the plurality of two-dimensional image points; and
    using the matrix transformation to adjust at least one of distortion and alignment of the target image in an imaging device.

3. The computer-implemented method of claim 2, wherein the source vector space and the target vector space are associated with a first side of an imageable substrate and the source vector space is for a reference image, the method further comprising:

receiving a third collection of a plurality of two-dimensional image points in a third vector space for a third image, representing a target image associated with a second side of the imageable substrate;

converting the third collection of two-dimensional image points into a homogenous form to enable and apply affine matrix transformation;

solving for a matrix transformation to map the source collection of the plurality of two-dimensional image points to the third collection of the plurality of two-dimensional image points; and using the matrix transformation to adjust at least one of distortion and alignment of the third image in an imaging device.

4. The computer-implemented method of claim 2, wherein the target collection of the plurality of two-dimensional image points represents a customer image, and the source collection of the plurality of two-dimensional image points represents a reference image.

5. The computer-implemented method of claim 4, wherein the source image is a preprinted form.

6. The computer-implemented method of claim 4, wherein the source image is associated to at least one of a first layer and a first marking engine printed by the imaging device and the target image is associated with at least one of a second layer and at least one of the first marking engine and a second marking engine printed by the imaging device.

7. The computer-implemented method of claim 2, wherein the source vector space and the target vector space are associated with a first side of an imageable substrate and the source vector space is for a reference image associated with a first side, and further comprising:

receiving a third collection of a plurality of two-dimensional image points in a third vector space for a third image representing a target image associated with a second side and receiving a fourth collection of a plurality of two-dimensional image points in a fourth vector space for a fourth image representing a source image associated with a second side;

converting the third collection and fourth collection of two-dimensional image points into a homogenous form to enable and apply affine matrix transformation;

solving for a matrix transformation to map the fourth collection of the plurality of two-dimensional image points to the third collection of the plurality of two-dimensional image points; and using the matrix transformation to adjust at least one of distortion and alignment of the third image in an imaging device.

8. The computer-implemented method of claim 2, wherein the source collection of the plurality of two-dimensional image points represents actual image points associated with a first side of an imageable substrate for see-through alignment and the target collection of the plurality of two-dimensional image points represents target image points associated with a second side of an imageable substrate.

9. The computer-implemented method of claim 2, wherein the source collection of the plurality of two-dimensional image points comprises a source grid of at least one geometric shape substantially covering an ideal medium.

10. The computer-implemented method of claim 9, wherein the target collection of the plurality of two-dimensional image points comprises at least one geometric shape substantially similar to the source grid of geometric shapes.

11. The computer-implemented method of claim 2, wherein the receiving the target collection of a plurality of two-dimensional registration image points includes receiving an image with associated distortion and/or mis-alignment of the imaging medium by an image capture device.

12. The computer-implemented method of claim 2, wherein the source collection $P_0$ of the plurality of two-dimensional image points represents the source vector space, the target collection of the plurality of two-dimensional image points $P_1$ represents the target actual image space, the matrix transformation comprises KS=T, the inverse matrix comprises a pseudo-inverse of the source collection of two-dimensional image points $P_0^+$ in the source vector space, and the mapping comprises $K=P_1 P_0^+$.

13. The computer-implemented method of claim 12, wherein the transformation K is solved by taking KS=T by:

taking a pseudo Inverse of $P_0$, such that, $P_0 \rightarrow P_0^+$;

multiply both sides by $P_0^+$, such that, $K P_0 P_0^+ = P_1 P_0^+$; and reducing $P_0 P_0^+$ to an identity matrix I, with $KI=P_1 P_0^+$, such that $K=P_1 P_0^+$.

14. A system to control placement of an image on an imaging device, the system comprising:

a memory;

a storage medium for storing data; and a processor in communication with said storage medium and said memory, said processor executing machine readable instructions for performing the method of:

receiving a source collection of a plurality of two-dimensional image points in a source vector space S for a source image and a target collection of a plurality of two-dimensional image points in a target vector space T for a target image, wherein the source collection of the plurality of two-dimensional image points and the target collection of the plurality of two-dimensional image points are different due to errors in a system;

converting the source collection of two-dimensional image points and the target collection of two-dimensional image points into a homogenous form to enable and apply affine matrix transformations;

solving for a matrix transformation to map the source collection of the plurality of two-dimensional image points to the target collection of the plurality of two-dimensional image points; and using the matrix transformation to adjust at least one of distortion and alignment of the target image in an imaging device.

15. The system of claim 14, wherein the source vector space and the target vector space are associated with a first side of an imageable substrate and the source vector space is for a reference image, the method further comprising:

receiving a third collection of a plurality of two-dimensional image points in a third vector space for a third image, representing a target image associated with a second side of the imageable substrate;

converting the third collection of two-dimensional image points into a homogenous form to enable and apply affine matrix transformation;

solving for a matrix transformation to map the source collection of the plurality of two-dimensional image points to the third collection of the plurality of two-dimensional image points; and using the matrix transformation to adjust at least one of distortion and alignment of the third image in an imaging device.

16. The system of claim 14, wherein the target collection of the plurality of two-dimensional image points represents a customer image, and the source collection of the plurality of two-dimensional image points represents a reference image.

17. The system of claim 16, wherein the source image is a preprinted form.

18. The system of claim 16, wherein the source image is associated to at least one of a first layer and a first marking engine printed by the imaging device and the target image is associated with at least one of a second layer and a second marking engine printed by the imaging device.

19. The system of claim 14, wherein the source vector space and the target vector space are associated with a first side of an imageable substrate and the source vector space is for a reference image associated with a first side, and further comprising:
  receiving a third collection of a plurality of two-dimensional image points in a third vector space for a third image representing a target image associated with a second side and receiving a fourth collection of a plurality of two-dimensional image points in a fourth vector space for a fourth image representing a source image associated with a second side;
  converting the third collection and fourth collection of two-dimensional image points into a homogenous form to enable and apply affine matrix transformation;
  solving for a matrix transformation to map the fourth collection of the plurality of two-dimensional image points to the third collection of the plurality of two-dimensional image points; and
  using the matrix transformation to adjust at least one of distortion and alignment of the third image in an imaging device.

20. The system of claim 14, wherein the source collection of the plurality of two-dimensional image points represents actual image points associated with a first side of an imageable substrate for see-through alignment and the target collection of the plurality of two-dimensional image points represents target image points associated with a second side of an imageable substrate.

* * * * *